Figure 1:
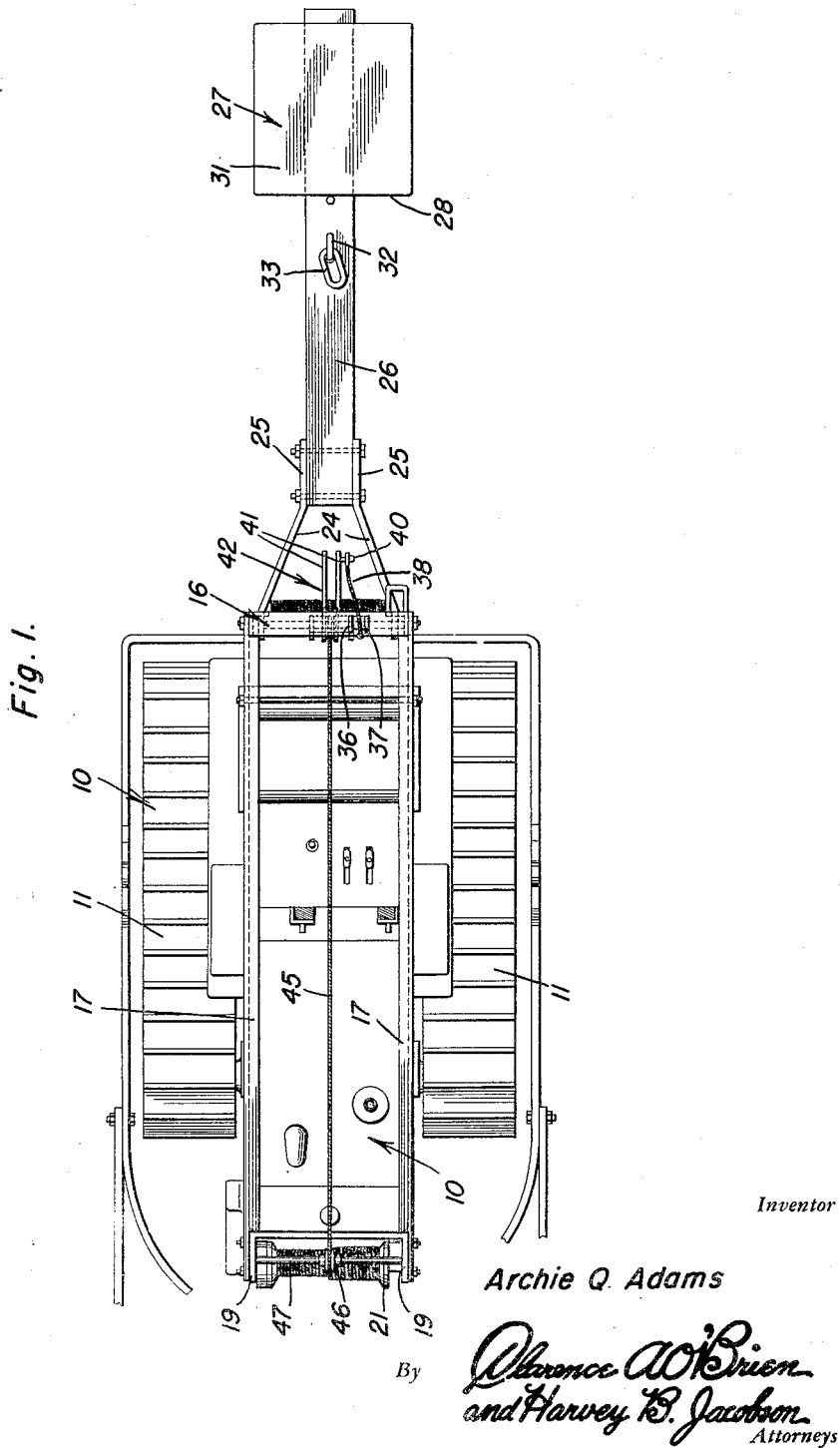

Nov. 14, 1950  A. Q. ADAMS  2,529,892
POWER HAMMER ATTACHMENT FOR TRACTORS
Filed Sept. 15, 1947  3 Sheets-Sheet 1

Inventor
Archie Q. Adams
By Clarence A. O'Brien
and Harvey B. Jacobson
Attorneys Nov. 14, 1950 A. Q. ADAMS 2,529,892
POWER HAMMER ATTACHMENT FOR TRACTORS
Filed Sept. 15, 1947 3 Sheets-Sheet 2

Inventor
Archie Q. Adams
By Clarence A. O'Brien
and Harvey B. Jacobson
Attorneys Nov. 14, 1950  A. Q. ADAMS  2,529,892
POWER HAMMER ATTACHMENT FOR TRACTORS
Filed Sept. 15, 1947  3 Sheets-Sheet 3
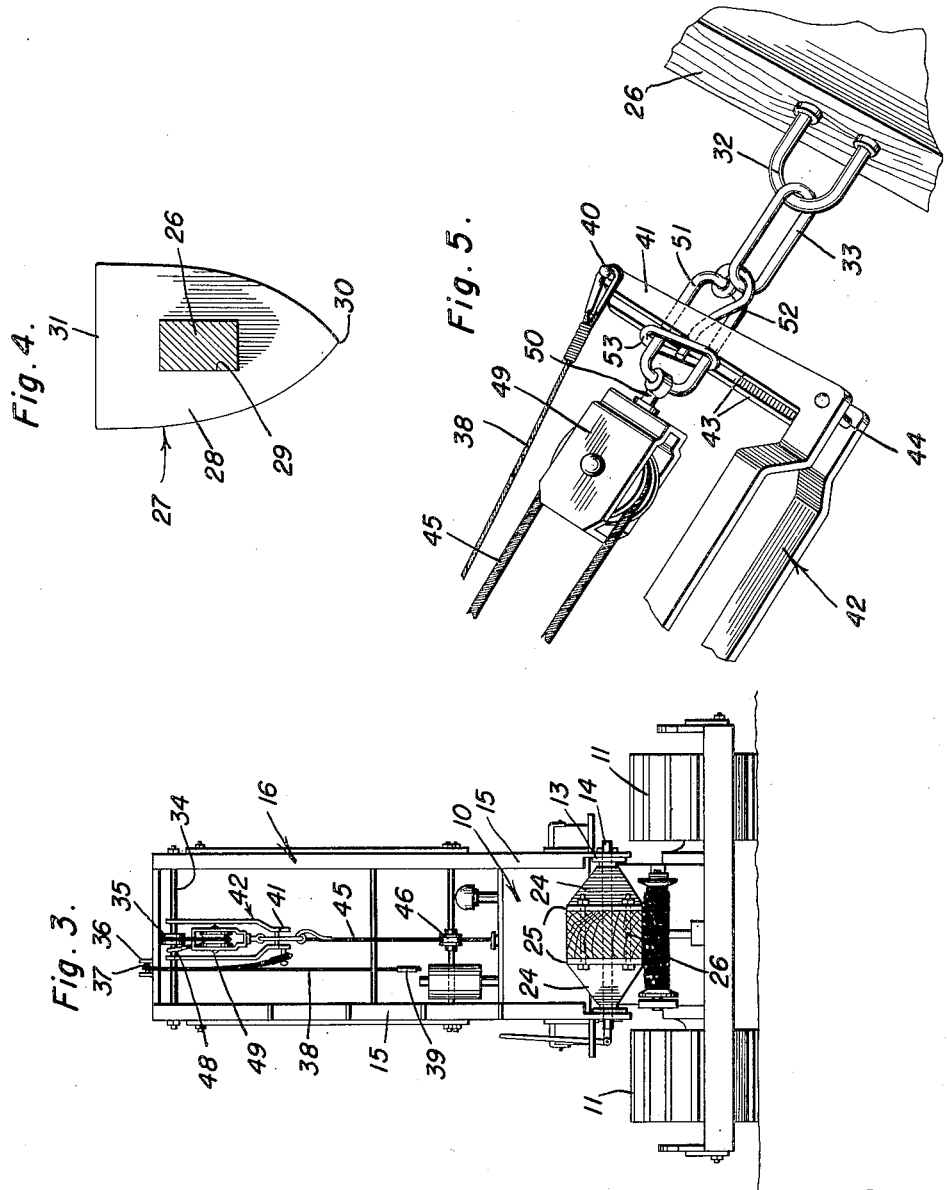
Inventor
Archie Q. Adams Patented Nov. 14, 1950

2,529,892

UNITED STATES PATENT OFFICE 2,529,892

POWER HAMMER ATTACHMENT FOR TRACTORS

Archie Q. Adams, Clatskanie, Oreg.

Application September 15, 1947, Serial No. 774,086

1 Claim. (Cl. 262—14)

This invention relates to a power hammer attachment for a tractor and has for its primary object to split stumps, break stones, concrete slabs, and the like.

Another object is to facilitate the attachment of the device to a conventional tractor having a power takeoff through the medium of which the hammer may be elevated preparatory to striking a blow on the work.

The above and other objects may be attained by employing this invention, which embodies, among its features, a lever adapted to be pivotally supported at one end on a tractor to swing in a vertical arc, a head mounted on the lever adjacent its end remote from the pivoted end, means coupled to the power takeoff of the tractor and to the lever for elevating the end of the lever remote from the pivoted end, and manually actuated means to release the lever from the elevating means before it reaches a vertical position to allow the head to fall by gravity onto the work to be operated upon.

Other features include a link carried by the lever near the head, a loop on the end of the cable remote from the winding drum, a hook pivotally mounted on the loop for engagement through the link on the lever detachably to couple the lever to the cable, a retaining ring slidable on the loop for engaging the hook and holding it in coupling position, and a manually actuated fork pivoted on the frame near its upper end to swing into ring-engaging and releasing position when the lever attains a predetermined elevated position relative to the frame.

Figure 2:
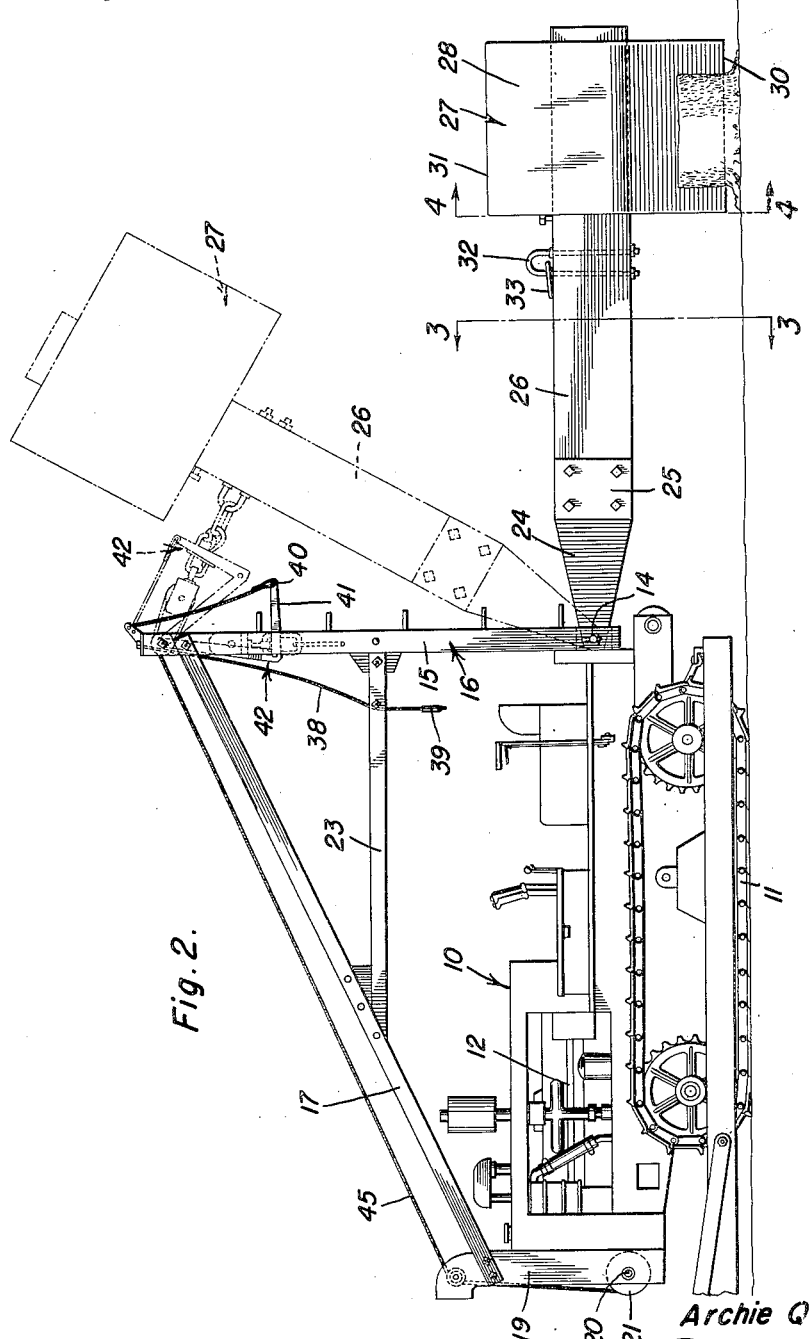

In the drawings,

Figure 1 is a top plan view of a tractor illustrating this improved power hammer and its elevating mechanism mounted thereon, Figure 2 is a side view of the device illustrated in Figure 1, Figure 3 is a sectional view taken substantially along the line 3—3 of Figure 1, Figure 4 is a sectional view taken substantially along the line 4—4 of Figure 1, and Figure 5 is a fragmentary perspective view on an enlarged scale illustrating the coupling means by which the lever and the lever elevating mechanism are connected together and the fork by which the lever is released from the lever elevating means.

Referring to the drawings in detail, a tractor, designated generally 10, of conventional form is equipped with Caterpillar treads 11 and a power plant 12 which is coupled in a conventional manner to drive the Caterpillar treads 11 selectively to move the tractor into the desired position. The tractor is also equipped with a conventional power takeoff which is coupled to the winding drum of the attachment, to be more fully hereinafter described, so that the drum may be rotated in one or the other direction according to the operation of the device.

Detachably secured to the rear end of the tractor are spaced ears 13 which are pierced with aligning openings to receive a pivot shaft 14. Pivotally mounted on the shaft adjacent opposite ends are the legs 15 of an inverted U-shaped frame, designated generally 16, which is supported in a vertical position relative to the tractor by means of brace bars 17, each of which is connected at one end to the frame 16 near its upper end, while the opposite end of each brace bar is connected adjacent the upper end of a pair of standards 19 detachably connected to the opposite end of the tractor. Mounted on a shaft 20 to rotate about a horizontal axis between the standards 19 adjacent their lower ends is a winding drum 21 which is connected in any suitable manner to the power takeoff of the tractor selectively to be driven in both directions thereby. Suitable intermediate brace bars 23 extend between the braces 17 and the legs 15 of the frame 16, as will be readily understood upon reference to Figure 2.

Pivotally supported on the pivot shaft 14 adjacent the lower end of each side bar 15 of the frame 16 is a pair of convergent pivot plates 24 which terminate in spaced parallel extensions 25 between which is bolted or otherwise rigidly fixed a lever arm 26. This lever arm 26 performs a function similar to that of the hammer handle of an ordinary hammer and detachably mounted on the end of the lever arm 26 remote from the pivot plates 24 is a head designated generally 27. This head comprises a body 28 of considerable mass which is provided with a rectangular opening 29 for the reception of the lever arm 26 and carries at one end a relatively sharpened edge 30. The opposite end of the body 28 terminates in a flat face 31 which lies in a plane substantially parallel with the top face of the lever arm 26. The head is detachably coupled to the lever arm 26 so that its position may be reversed and the sharpened edge turned upwardly when it is desired to use the flat face 31 as the impact element. Fixed to the lever arm 26 near the head 27 is an eye 32 in which a link 33 is held.

Extending transversely across the frame 16 adjacent the upper ends of the arms 15 is a shaft 34, intermediate the ends of which is rotatably supported a sheave 35, and mounted in a suitable bracket 36 carried by the frame 16 adjacent its upper end is a roller 37 over which a control cable 38 is trained. This control cable is provided with a handle 39 which is located near the operator's position and within easy reach of the operator of the device. The end of the cable opposite the handle is coupled, as at 40, to one tine 41 of a release fork designated generally 42. This release fork is pivotally suspended from the shaft 34 and, as illustrated in Figure 5, the upper faces 43 of the tines 41 incline upwardly and rearwardly from the end to which the cable is attached to the opposite end of the fork. The tines are joined adjacent their ends remote from the cable anchorage 40 by a transversely extending rivet 44, as will be readily understood upon reference to Figure 5.

Fixed to the winding drum 21 is one end of a cable 45 which is trained upwardly and over a guide roller or pulley 46 mounted on a shaft 47 which extends transversely between the upper ends of the standards 19. This pulley 46 is arranged to operate in the same vertical plane with the pulley 35, and the cable 45 is trained over the pulley 35 to be detachably coupled to the lever 26 which swings through a vertical arc which lies in a plane with the pulleys 35 and 46. The end of the cable 45 opposite that which is attached to the drum 21 is fixed, as at 48, to the shaft 34 near the pulley 35, and mounted in the loop of the cable formed between the sheave 35 and its attachment 48 is a pulley block 49, the frame of which carries an eye 50 through which a closed loop 51 extends. Pivotally supported on the end of the loop 51 opposite that secured in the eye 50 is a hook 52 which, as illustrated in Figure 5, is adapted to engage the link 33 in order to elevate the lever arm 26. The end of the hook 52 opposite that which is pivoted to the loop 51 is extended and bent to lie in the plane of the loop when it is in closed position, and slidably mounted on the loop is a ring 53 which, as illustrated in Figure 5, is adapted to enclose the free end of the hook 52 to hold the hook in closed position. It will thus be seen that when the cable 45 is paid out from the drum 21, the pulley block 49 may be lowered, and with the hook 52 open, its free end may be passed through the link 33 and the hook then moved to closed position, after which the ring 53 is moved downwardly toward the link 33 to hold the hook and prevent it from opening under the weight of the lever arm 26 and hammer head 27 during the winding movement of the cable 45 onto the drum 21.

In use, it will be understood that the hook 52 is coupled to the link 33, as previously described, with the ring 53 moved downwardly into hook-retaining position. As the winding drum 21 is rotated to wind the cable 45 thereon, the block 49 will move upwardly toward the upper end of the frame 16 until the lever arm 26 and head 27 attain the position substantially shown in broken lines in Figure 2. Having thus been elevated through a vertical arc, pull is exerted on the handle 39 of the cable 38, thus swinging the fork 42 into the position indicated by the broken lines in Figure 2, thus bringing the inclined tines 41 of the fork 42 into engagement with the ring 53. Upon further upward movement of the hook under the influence of downward pull on the handle 39, the inclined faces 43 will move the ring 53 longitudinally of the loop 51 until it disengages the end of the hook 52. Such disengagement will permit the hook 52 to swing about its pivot under the weight of the lever arm 26 and head 27 so as to permit the link 33 to slip off of the end of the hook and thus allow the head 27 to descend by gravity onto the work. Obviously, the fork 42 having released the ring 53 may be permitted to drop back to its initial position so that as the tines 41 move away from the loop 51, the hook 52 will be free to swing about its pivot without interference from the fork.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

A power hammer attachment for a tractor having a power takeoff which includes a vertical frame adapted to be fixed to one end of the tractor, a lever pivoted at one end adjacent the lower end of the frame to swing in a vertical arc, a head mounted on the lever adjacent its end remote from the pivoted end, a sheave mounted in the frame adjacent its upper end, a winding drum coupled to the power takeoff of the tractor, a cable trained over the sheave and being coupled at one end to the winding drum for winding thereon, a link carried by the lever adjacent the head, a loop on the end of the cable remote from the winding drum, a hook pivotally mounted on the loop for engagement through the link on the lever detachably to couple the lever to the cable, a retaining ring slidable on the loop for engaging the hook and holding it in coupling position, a fork pivoted on the frame near its upper end and a manually actuated cable to swing the fork about its pivot into ring-engaging and releasing position when the lever attains a predetermined elevated position relative to the frame.

ARCHIE Q. ADAMS.

REFERENCES CITED

The following references are of record in the file of this patent:

UNITED STATES PATENTS

| Number | Name | Date |
| --- | --- | --- |
| 2,029,363 | Downie | Feb. 4, 1936 |
| 2,313,802 | Carlson | Mar. 16, 1943 |
| 2,356,279 | Simonds | Aug. 22, 1944 |